(12) United States Patent
Grilliot et al.

(10) Patent No.: US 6,658,670 B1
(45) Date of Patent: Dec. 9, 2003

(54) COMPOSITE STRUCTURE FOR PROTECTIVE GARMENT

(75) Inventors: William L. Grilliot, Dayton, OH (US); Mary I. Grilliot, Dayton, OH (US)

(73) Assignee: Morning Pride Manufacturing, L.L.C., Dayton, OH (US)

( * ) Notice: Subject to any disclaimer, the term of this patent is extended or adjusted under 35 U.S.C. 154(b) by 250 days.

(21) Appl. No.: 09/659,957

(22) Filed: Sep. 12, 2000

(51) Int. Cl.⁷ ............................................... A41D 27/02
(52) U.S. Cl. ........................... 2/272; 2/1; 2/97; 2/458; 442/238; 442/239; 442/244; 442/245; 442/255; 442/327
(58) Field of Search ............................... 442/327, 239, 442/238, 255, 244, 245; 2/458, 1, 97, 272

(56) References Cited

U.S. PATENT DOCUMENTS

| | | | |
|---|---|---|---|
| 2,855,758 A | 10/1958 | Johnson | 62/4 |
| 3,429,138 A | 2/1969 | Goldmerstein | 62/259.3 |
| 3,670,731 A | 6/1972 | Harmon | 604/368 |
| 3,971,373 A | 7/1976 | Braun | 128/206.19 |
| 4,105,033 A | 8/1978 | Chatterjee et al. | 604/368 |
| 4,133,055 A | 1/1979 | Zebuhr | 2/411 |
| 4,235,237 A | 11/1980 | Mesek et al. | 604/368 |
| 4,429,001 A | 1/1984 | Kolpin et al. | 442/340 |
| 4,433,024 A | 2/1984 | Eian | 428/198 |
| 4,530,873 A | 7/1985 | Okada | 442/79 |
| 4,556,055 A | 12/1985 | Bonner, Jr. | 604/304 |
| 4,985,298 A | 1/1991 | Buckley et al. | 442/333 |
| 4,999,850 A | * 3/1991 | Grilliot et al. | 2/126 |
| 5,087,513 A | 2/1992 | Kim | 442/118 |
| 5,113,666 A | 5/1992 | Parrish et al. | 62/259.3 |
| 5,224,221 A | 7/1993 | Richardson et al. | 2/168 |
| 5,289,695 A | 3/1994 | Parrish et al. | 62/259.3 |
| 5,328,759 A | 7/1994 | McCormack et al. | 442/402 |
| 5,419,955 A | 5/1995 | Ehrhardt et al. | 442/414 |
| 5,483,697 A | 1/1996 | Fuchs | 2/161.7 |
| 5,486,410 A | 1/1996 | Groeger et al. | 442/353 |
| 5,524,294 A | 6/1996 | Richardson et al. | 2/161.7 |
| 5,572,745 A | 11/1996 | Mainus | 2/171.2 |
| 5,597,647 A | 1/1997 | Powers | 442/362 |
| 5,630,230 A | 5/1997 | Fujino et al. | 2/200.1 |
| 5,817,365 A | 10/1998 | Richardson et al. | 427/7 |
| 5,885,912 A | 3/1999 | Bumbarger | 442/239 |
| 5,887,276 A | 3/1999 | Lee | 2/7 |
| 5,956,759 A | 9/1999 | Benedict | 2/7 |
| 6,317,889 B1 | * 11/2001 | Reilly et al. | 2/24 |

* cited by examiner

Primary Examiner—Terrel Morris
Assistant Examiner—John J. Guarriello
(74) Attorney, Agent, or Firm—Wood, Phillips, Katz, Clark & Mortimer

(57) ABSTRACT

A composite structure for a protective garment, such as a pair of bunker pants for a firefighter, a bunker coat for a firefighter, or a glove for a firefighter, has a moisture absorber, a moisture barrier covering the moisture absorber, and an outer shell covering the moisture barrier. The moisture absorber has a fibrous matrix incorporating a superabsorbent polymer, as particles or as fibers, and is disposed between an inner cover pervious to moisture and an outer cover. The inner and outer covers may be quilted so as to segregate discrete regions of the fibrous matrix. In one contemplated embodiment, the moisture barrier is affixed to the outer shell so as to have surface-to-surface adhesion between an outer surface of the moisture barrier and an inner surface of the outer shell. In another contemplated embodiment, the the moisture barrier is affixed to the outer cover of the moisture absorber so as to have surface-to-surface adhesion between an inner surface of the moisture barrier and an outer surface of the outer cover of the moisture absorber.

12 Claims, 1 Drawing Sheet

COMPOSITE STRUCTURE FOR PROTECTIVE GARMENT

TECHNICAL FIELD OF THE INVENTION

This invention pertains to a composite structure for a protective garment, such as a pair of bunker pants for a firefighter, a bunker coat for a firefighter, or a glove for a firefighter. This invention contemplates that the composite structure incorporates a superabsorbent polymer.

BACKGROUND OF THE INVENTION

Commonly, in a firefighting environment, a firefighter wearing protective garments, such as bunker pants, a bunker coat, and gloves, sweats copiously within such garments, whereby the firefighter is exposed to severe stresses due to sweating, as well as to severe stresses due to firefighting. Such stresses are known to contribute significantly to fatigue, injuries, and fatalities among firefighters.

This invention addresses an ascertained need for a composite structure, from which such garments could be made and which would employ a superabsorbent polymer to absorb copious amounts of human sweat, whereby to reduce such stresses due to sweating.

Usage of a superabsorbent polymer in a composite structure for a protective garment, such as a protective garment for a firefighter, is disclosed in U.S. Pat. No. 5,885,912 to Bumberger, the disclosure of which is incorporated herein by reference.

SUMMARY OF THE INVENTION

This invention provides a composite structure for a protective garment, such as a pair of bunker pants for a firefighter, a bunker coat for a firefighter, or a glove for a firefighter. The composite structure has a moisture absorber, a moisture barrier covering the moisture absorber, and an outer shell covering the moisture barrier. The moisture absorber incorporates a superabsorbent polymer.

Preferably, the moisture absorber has a fibrous matrix incorporating the superabsorbent polymer, as particles or as fibers. Preferably, the fibrous matrix is disposed between an inner cover, which is moisture-pervious, and an outer cover, which is moisture-pervious or moisture-impervious. Preferably, the inner and outer covers, between which the fibrous matrix is disposed, is quilted so as to segregate discrete regions of the fibrous matrix.

In one contemplated embodiment, the moisture barrier is affixed to the outer shell so as to have surface-to-surface adhesion between an outer surface of the moisture barrier and an inner surface of the outer shell. Thus, the moisture barrier may be a moisture-impervious layer, e.g. a neoprene layer, which is laminated to the inner surface of the outer shell, or a moisture-impervious layer, e.g. a Breathe Tex™ layer, which is coated on the inner surface of the outer shell. In an alternative embodiment, the moisture barrier is affixed to the outer cover of the moisture absorber so as to have surface-to-surface adhesion between an inner surface of the moisture barrier and an outer surface of the outer cover of the moisture absorber.

Hereinbefore and hereinafter, moisture refers to any predominantly aqueous liquid, particularly but not exclusively water or human sweat. Hereinbefore and hereinafter, terms such as inner and outer are employed from a standpoint of a wearer of a protective garment.

DETAILED DESCRIPTION OF THE ILLUSTRATED EMBODIMENTS

Figure 1:
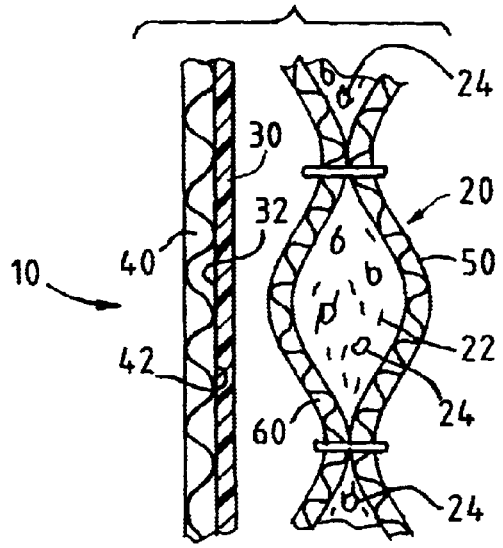
FIG. 1 is a fragmentary, cross-sectional view of a composite structure constituting one contemplated embodiment of this invention.

As shown in FIG. 1, a composite structure 10 for a protective garment, such as a pair of bunker pants for a firefighter, a bunker coat for a firefighter, or a glove for a firefighter, is made from fire-resistant materials and has a moisture absorber 20, a moisture barrier 30 covering the moisture absorber 20, and an outer shell 40 covering the moisture barrier 30. As explained below, the moisture absorber 20 incorporates a superabsorbent polymer, which may be a cross-linked polyacrylamide and which can absorb copious amounts of human sweat.

In the embodiment shown in FIG. 1, the moisture barrier 30 is affixed to the outer shell 40 so as to have surface-to-surface adhesion between an outer surface 32 of the moisture barrier 30 and an inner surface 42 of the outer shell 40. Thus, the moisture barrier 30 may be a moisture-impervious layer, e.g. a neoprene layer, which is laminated to the inner surface 42 of the outer shell 40, or a moisture-impervious layer, e.g. a Breathe Tex™ layer, which is coated on the inner surface 42 of the outer shell 40.

As shown in FIG. 1, the moisture absorber 20 has a fibrous matrix 22 incorporating particles 24 of the superabsorbent polymer. Alternatively, the fibrous matrix 22 incorporates fibers of the superabsorbent polymer. The fibrous matrix 22 is disposed between an inner cover 50, which is moisture-pervious, and an outer cover 60, which is moisture-pervious. The covers 50, 60, between which the fibrous matrix 22 is disposed, are textile layers, which are quilted to segregate discrete regions of the fibrous matrix 22.

Examples of superabsorbent polymers and processes for their incorporation into fibrous matrices are disclosed in prior patents including U.S. Pat. No. 3,670,731 to Harmon, U.S. Pat. No. 4,105,033 to Chaterjee et al, U.S. Pat. No. 4,235,237 to Mesek et al., U.S. Pat. No. 4,429,001 to Kolpin et al., U.S. Pat. No. 4,985,298 to Buckley et al., U.S. Pat. No. 5,087,513 to Kim, U.S. Pat. No. 5,328,759 to McCormack et al., and U.S. Pat. No. 5,419,955 to Ehrhardt et al., the disclosures of which are incorporated herein by reference.

Figure 2:
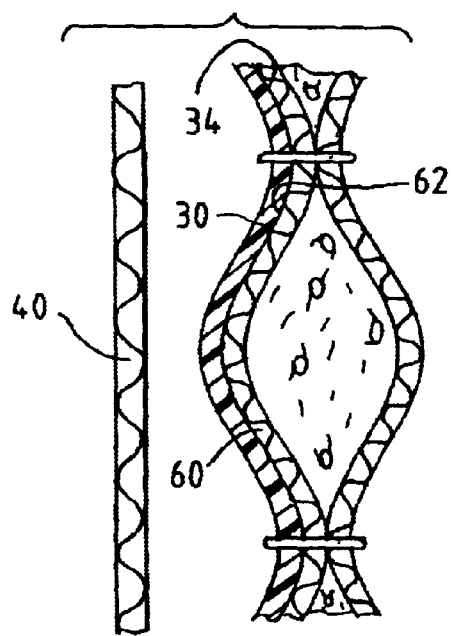
FIG. 2 is a fragmentary, cross-sectional view of a composite structure constituting an alternative embodiment of this invention.

In the embodiment shown in FIG. 2, the moisture barrier 30 is not affixed to the outer shell 40 so as to have surface-to-surface adhesion, as described above. Rather, the moisture barrier 20 is affixed to the outer cover 60 of the moisture absorber 20 so as to have surface-to-surface adhesion between an inner surface 34 of the moisture barrier 30 and an outer surface 62 of the outer cover 60 of the moisture absorber 20. Thus, the moisture barrier 30 may be a moisture-impervious layer, e.g a neoprene layer, which is laminated to the outer surface 62 of the outer cover 60 of the moisture absorber 20, or a moisture-impervious layer, e.g. a Breathe Tex™ layer, which is coated on the outer cover 60 of the moisture absorber 20.

In each of the embodiments shown and described, the superabsorbent polymer can absorb copious amounts of human sweat, whereby to reduce sweat-caused stresses on a firefighter wearing a protective garment made from the composite material.

What is claimed is:

1. A protective garment comprising a composite structure having a moisture absorber, a moisture barrier covering the moisture absorber, and an outer shell covering the moisture barrier, the moisture barrier being interposed between the moisture absorber and the outer shell, wherein the moisture absorber incorporates a superabsorbent polymer and is the innermost layer of said garment.

2. The protective garment of claim 1 wherein the moisture absorber has a fibrous matrix incorporating the superabsorbent polymer.

3. The protective garment of claim 2 wherein the fibrous matrix is disposed between an inner cover pervious to moisture and an outer cover.

4. The protective garment of claim 3 wherein the inner and outer covers, between which the fibrous matrix is disposed, is quilted so as to segregate discrete regions of the fibrous matrix.

5. The protective garment of claim 3 wherein the moisture barrier is affixed to the outer cover of the moisture absorber so as to have surface-to-surface adhesion between an inner surface of the moisture barrier and an outer surface of the outer cover of the moisture absorber.

6. The protective garment of claim 1 wherein the moisture absorber has a fibrous matrix incorporating particles of the superabsorbent polymer.

7. The protective garment of claim 6 wherein the fibrous matrix is disposed between an inner cover pervious to moisture and an outer cover.

8. The protective garment of claim 7 wherein the inner and outer covers, between which the fibrous matrix is disposed, is quilted so as to segregate discrete regions of the fibrous matrix.

9. The protective garment of claim 1 wherein the moisture absorber has a fibrous matrix incorporating fibers of the superabsorbent polymer.

10. The protective garment of claim 9 wherein the fibrous matrix is disposed between an inner cover pervious to moisture and an outer cover.

11. The protective garment of claim 10 wherein the inner and outer covers, between which the fibrous matrix is disposed, is quilted so as to segregate discrete regions of the fibrous matrix.

12. The protective garment of any one of claims 1 through 10 wherein the moisture barrier is affixed to the outer shell so as to have surface-to-surface adhesion between an outer surface of the moisture barrier and an inner surface of the outer shell.

* * * * *